United States Patent

Hundertmark et al.

[11] Patent Number: 5,603,279
[45] Date of Patent: Feb. 18, 1997

[54] POWER STEERING ASSIST

[75] Inventors: James M. Hundertmark, Fond du Lac County; Timothy W. Merten, Winnebago County, both of Wis.

[73] Assignee: Performance 1 Marine, Inc., Overland Park, Kans.

[21] Appl. No.: 422,893

[22] Filed: Apr. 17, 1995

[51] Int. Cl.⁶ .................................................. B63H 25/22
[52] U.S. Cl. .............................................. 114/150; 440/61
[58] Field of Search ............................. 114/150; 440/61, 440/62, 63; 180/158, 159, 162, 163

[56] References Cited

U.S. PATENT DOCUMENTS

| | | | |
|---|---|---|---|
| 3,913,517 | 10/1975 | Lohse et al. | 440/61 |
| 4,592,732 | 6/1986 | Ferguson | 114/150 |
| 4,778,416 | 10/1988 | Rhoads et al. | 114/150 |
| 5,409,076 | 4/1995 | Huber et al. | 114/150 |

Primary Examiner—Jesus D. Sotelo
Attorney, Agent, or Firm—R. Jonathan Peters

[57] ABSTRACT

A power steering assist system, especially adaptable for a marine vehicle having a propulsion unit pivotal about a steering axis and including a steering member to effect steering movement thereof about the steering axis and an operator actuable steering helm, comprising a hydraulic cylinder, a rotary valve body disposed adjacent the hydraulic cylinder and having a valve control adapted to establish fluid communication between the hydraulic cylinder and a fluid source for supplying hydraulic fluid to the cylinder. A ball screw, operably connected with the valve body, and a ball nut, having a recirculating ball connection with the ball screw, is operably connected to the piston so as to move axially on reciprocal movement of the piston. Pressurized hydraulic fluid is supplied to the cylinder and to either side of the piston to effect reciprocal movement of the piston, whereby axial movement of the ball nut is translated into rotary movement of the ball screw so as to rotate the valve body. An output member is operably connected to the piston and to the steering member.

26 Claims, 6 Drawing Sheets

POWER STEERING ASSIST

FIELD OF THE INVENTION

This invention relates to hydraulic power steering assist. More specifically, this invention relates to hydraulic power steering assist system especially adaptable for marine vehicles and mounted remote from the propulsion unit.

BACKGROUND AND PRIOR ART

In a conventional steering system such as for outboard motors used on boats, the propulsion unit, typically mounted on the transom of the boat, is pivoted about a vertical steering axis upon steering actuation by the operator at the helm. One typical steering system for a boat having a transom mounted engine comprises a steering cable extending between the steering helm and the propulsion unit so that steering at the helm actuates the cable for causing steering movement of the propulsion unit about a steering axis. A conventional steering cable is the push-pull cable comprising a reciprocative inner core slidable in a protective, flexible outer sheath or housing. One end of the cable is actuably connected to the steering helm, and the other end is actuably connected to the steering mechanism of the propulsion unit. When the wheel is turned at the helm, the cable is actuated by a push-pull movement of the inner core, thereby causing a steering movement of the propulsion unit. Hydraulic activated steering means can be used in place of the cable steering, wherein hydraulic fluid, e.g. oil, is pumped from the steering helm through conduits to a cylinder-piston control means in response to rotation of the steering wheel in one direction or the other. Actuation of the control means actuates the steering mechanism of the propulsion unit, thereby turning the propulsion unit in a common direction. Prior art teaching steering systems of this type include the following U.S. Pat. Nos.: 4,592,732; 4,615,290; 4,632,049; 4,568,292; 4,295,833; and 5,074,193; and French patent 1,133,061. Additionally, British Patent Application 2,159,483A discloses a power steering system for an outboard having a hydraulic cylinder-piston assembly and a control valve which is operated by an actuator including a push-pull cable to selectively extend and retract the piston rod and effect steering of the propulsion unit. The power steering assist system as taught in each of the prior art patents and British application identified above, however, is mounted onto and supported by the propulsion unit. Mounting the power steering system on the propulsion unit is disadvantageous for a number of reasons. First, the propulsion unit mounting position must be changed because there is a steering apparatus to conflict with the boat transom design during vertical tilt movement. In order to mount the power steering system to the propulsion unit, special bracketry is required for each engine design, because the mounting pads vary markedly depending on the design. Exemplary of engine mounting is the disclosure in the above identified British Patent Application, where, as shown in FIG. 7, the power assist unit 120 is mounted on a propulsion unit 10, which is mounted to a boat transom 22. As the propulsion unit 10 tilts about the horizontal axis 42, the power assist unit 120 may come into contact with the boat transom, thereby limiting its applicability. A second disadvantage is that the power steering system, including the supply and return lines which are under high pressure, are subjected to sun rays, salt water corrosion, and physical abuse because of exposure. Thirdly, such designs as shown in the prior art do not allow for steering shock to be absorbed partially by the steering cable, in that any steering shock is prevented from passing beyond the power assist steering system causing a high stress on the propulsion unit steering components. Lastly, the systems of the prior art, and in particular such a system as taught by the aforesaid British Patent Application, are designed to continuously supply fluid to the system, and not just when steering movement occurs. This constant fluid supply system wastes propulsion engine horsepower.

U.S. Pat. No. 497,706 discloses an in-line steering assist system in that the system is mounted remote from the rudder disposed adjacent the propeller. A retractable carriage is moved by a fluid actuated piston, and a cable extending from the piston, around pulleys on the carriage and to the rudder disk, moves the disk in response to movement of the piston. Little or no torque created at the rudder is consumed by the steering assist means to thereby reduce the steering effort required at the helm.

The prior art also discloses a steering mechanism for a boat utilizing a gear assembly for steering the boat, typically the gear assembly actuates a steering member on the engine in response to the steering input at the steering wheel. This prior art includes U.S. Pat. Nos.: 1,425,887; 1,852,151; 2,700,358; 2,891,498; 2,939,417; 3,181,491; 3,669,146; 4,416,637; 4,890,683; and 5,018,469. None of these references, however, incorporate a power steering assist mechanism with the gear assembly.

Power steering systems for marine vehicles mounted remote from the propulsion unit, and overcoming the several disadvantages of the prior art, are disclosed in U.S. Pat. No. 5,228,405, and in co-pending U.S. patent application Ser. No. 08/012,552, both of which are assigned to the same assignee as the subject application, and are incorporated by reference into this specification. In such hydraulic power steering systems, the torque originating from the propulsion unit is overcome, thereby restraining the steering forces created by this torque. That is, the power steering assist means reduces the effort at the steering helm or wheel to only the effort required to operate the hydraulic assembly, which is independent of the torque generated by the propulsion unit. The power steering system of the issued patent comprises a push-pull cable as the input steering member operably connected to a hydraulic cylinder-piston assembly having a valve actuating means, and an output steering member such as a push-pull cable operably connected to the cylinder-piston assembly and to the steering member of the propulsion unit. Steering at the helm effects a common movement of the steering arm. In the pending application, the input and output steering members comprises a gear drive means.

Power steering assist for automobiles is commonplace, which basically employs a hydraulic power cylinder and piston, such as shown in U.S. Pat. No. 3,121,345 to Zeigler et al. In Zeigler et al., the power steering system disclosed in FIG. 4 comprises a cylinder 10' divided by piston 94 to form chambers 96 and 101, a rotary valve 84, and input shaft or stub shaft 90 connected to the steering shaft. When the steering wheel is turned, the input shaft rotates the valve to open fluid passageways, and oil is directed to the proper side of the piston-chamber and is released from the opposite chamber (depending on the direction of turn), thereby actuating sleeve 40' and shaft 54' to rock pitman arm 60'. The recirculating ball system permits linear travel of the sleeve, which is translated into rotary movement of the shaft. A torsion bar 86 maintains the valve in a neutral position, and turning the steering wheel deflects the torsion bar to change the relationship between the fluid passageways. When in a neutral or no-steering position, the torsion bar maintains the relative positions of the fluid passageways so that fluid is delivered under equal pressure to both chambers in the cylinder. Thus, when the steering action is completed, the power steering assist is returned to a neutral or center position, which is characteristic of power steering for automobiles because it is essential to have feed back from the road so that a sense of steering is retained. For example, if the car hits a small obstacle or a front tire goes flat, this load or force is immediately fed back to the steering wheel. This load is loosely analogous to the torque created by the propulsion unit of a boat, but for a marine vehicle there should be essentially no feed back to the steering wheel.

Additional references relating to steering systems for land vehicles include U.S. Pat. No. 3,473,324 to Mercier. This patent discloses a distributor valve or spool valve 36 and actuator 35. Turning the wheel 12 directs oil to one side of the valve, and the oil pressure laterally moves member 61 (comparable to a piston) which opens the passageways to force oil into the actuator thereby actuating piston 47 and moving rod 48. U.S. Pat. No. 4,316,519 to Taig discloses a power steering unit comprising a spool valve 142 (see FIGS. 7 and 8), which is actuated on steering thereby directing fluid to the cylinder 66 and against the piston 56 or 62 to move the cylinder sleeve and turn the wheels. There is disclosed in U.S. Pat. No. 2,094,466 to Proctor a hydraulic system comprising a cam actuated valve with check valves to direct the flow of fluid and actuate a jack. Lastly, U.S. Pat. No. 5,289,893 to Yamamoto et al. discloses a steering control mechanism comprising a rack 84 and pinion 92 for actuating lateral shaft 82 linked to the actuator 130 for steering the wheels, and a three-way solenoid valve 13 for directing fluid to either side of the piston 134 in the actuator.

SUMMARY OF THE INVENTION

In accordance with the present invention, there is provided a power steering system for a marine vehicle, such as for an outboard, having a steering helm and propulsion unit pivotal about a steering axis. The power steering system comprises a hydraulic power steering assist system interposed between the propulsion unit and the steering helm and mounted remote from the propulsion unit, and is operably connected to the helm to effect actuating input to the power steering assist upon steering actuation at the steering helm. Actuable output means is operably connected to the power steering assist means for operative movement in response to the actuating input. Actuable steering means is operably connected to the output means and to the propulsion unit to effect steering movement of the propulsion unit about the steering axis. The steering helm typically includes a steering wheel and is operator actuable, and the power steering assist means is actuated in response to rotation of the steering wheel.

It will be observed that the power steering assist system of the invention is adjacent the helm, and mounted remote from the propulsion unit. The position of the power steering assist system, however, is not restricted to the actual physical arrangement, but rather to the operable arrangement. Where desired, the power steering assist system may be spaced from the steering helm. Regardless of the apparent physical arrangement, the power steering assist system is mounted remote from the propulsion unit.

Broadly, the power steering assist system of the present invention comprises a hydraulic cylinder-piston assembly having a reciprocally mounted piston, and fluid passageways longitudinally or axially spaced to each side of the piston to form a first chamber and a second chamber in the cylinder, and valve control means to regulate the flow of hydraulic fluid through the power steering assist means. Preferably, the valve control means comprises a rotatable valve body having first and second valve means, and is disposed coaxially with and adjacent one end of the cylinder-piston assembly. A rotatable input member (e.g., steering shaft or extension thereof) actuable upon steering at the helm is operably connected to the valve control means, preferably an actuator means for selectively opening one valve means or the other depending on the direction of turning. A fluid source means supplies pressurized hydraulic fluid to the cylinder. Thus, steering at the helm actuates the valve control means for regulating the flow of pressurized hydraulic fluid through the cylinder thereby reciprocating the piston in one direction or the other depending upon the steering direction. The effective areas of each side of the piston are unequal. The valve control means selectively controls the flow of hydraulic fluid to the cylinder, whereby the resulting reciprocal movement of the piston is determined by the flow of pressurized fluid supplied to or exhausted from the chamber having the piston side of greater effective ares.

A first fluid communication means establishes communication between the fluid source means, the first chamber of the cylinder, the valve control means, and the second chamber upon steering one direction; and a second fluid communication means establishes communication between the first chamber of the cylinder, the valve control means, and the fluid source means upon steering in the opposite direction. A connecting member is operably connected to the piston and to the valve body, including means mounted for rotatable movement upon reciprocal movement of the piston, thereby transmitting rotational movement to the valve body. Output means is operably connected to the cylinder-piston assembly and to the steering means such as the steering member of a propulsion unit or engine.

In a preferred embodiment of the invention, the connecting member includes a ball screw extending longitudinally or axially in the cylinder through the piston, and is operably connected at one end thereof with the valve body. A ball nut in concentric relation with the ball screw, and having a recirculating ball connection with the ball screw, is operably connected with the piston so as to move linearly or axially on reciprocal movement of the piston. Upon steering actuation, the valve control means is actuated and pressurized hydraulic fluid is introduced to one chamber or the other of the cylinder-piston assembly (to one side of the piston) depending upon the direction of steering, so as to cause reciprocal movement of the piston and thereby corresponding axial movement of the ball nut. This axial movement is translated into rotary movement of the ball screw, which in turn rotates the valve body. Anti-rotational means inhibits the rotation of the piston. The rotational speed of the valve body substantially corresponds to the rotational speed of the steering shaft, thereby keeping the valve control means open. That is, the valve body rotates at substantially the same rate or speed as the steering input. When the steering action is stopped, the valve body will continue to rotate until the valve control means is closed, thereby interrupting the flow of oil. The system then stops.

It is preferred to utilize a piston having differential piston areas, that is, the effective areas are unequal, most preferably in a ratio of two to one. This difference allows the use of two valve means positioned or housed in the valve body instead of four, which is common for conventional systems having an inlet and outlet disposed to each side of the piston.

In a preferred embodiment, the actuable output means comprises a hydraulic output means operably connected to the power steering assist means for operative movement in response to actuation of the power steering assist. Actuable steering means is operably connected at one end to the hydraulic output means and is responsive to operative movement of the output means for overcoming torque on the propulsion unit relative to the steering axis in response to actuable movement of the actuable steering means. At its opposed end, the actuable steering means is operably connected to the steering member of the propulsion unit for effecting common movement of the steering member in response to actuable movement of the actuable steering means upon steering actuation of the steering helm to pivot the propulsion unit about the steering axis.

As explained above, the power steering assist means comprises a hydraulic cylinder-piston assembly, and a rotatable valve body housing a valve control means normally biased to a closed position. A hydraulic fluid source means provides pressurized hydraulic fluid to the cylinder-piston assembly. The fluid source means comprises an accumulator means for delivering hydraulic fluid to the cylinder-piston assembly, and a reservoir means for accepting hydraulic fluid directed from the cylinder-piston assembly and passing the fluid to the accumulator. Steering movement actuates the valve control means to open fluid communication and provide for delivery of pressurized fluid through the cylinder-piston assembly from the fluid source means, thereby simultaneously providing output to actuate the actuable steering means to effect common movement of the steering member. The valve control means is actuated selectively for a right turn direction or for a left turn direction, and this actuable movement is preset so that it is substantially equal for both turn directions. In the preferred embodiment, the valve control means comprises two spaced apart valves in a rotary valve housing with the valves biased to a closed position, and the steering actuation opens one valve only depending on the steering direction, thereby directing the flow of pressurized hydraulic fluid. Pressurized hydraulic fluid delivered to the cylinder-piston assembly reciprocates the piston, and associated means operably connected to the piston actuates the output means to effect common movement of the steering member.

Suitable actuable steering means may be mechanical, electrical or hydraulic, or a combination of any two. In a preferred embodiment of the invention, the actuable steering means is a hydraulic system comprising a cylinder and piston arrangement operably connected with the power steering assist to effect output. In response to steering movement at the helm, reciprocal movement of the piston of the power steering assist means in turn actuates the piston of the steering means. Thus, steering movement at the helm effects common movement at the steering member to pivot the propulsion unit about a vertical steering axis. Where desired, actuable steering means comprises a mechanical push-pull cable arrangement comprising a flexible outer sheath or cover and an inner core axially slidable in the sheath. The sheath protects the core, and also helps in directing the cable and in preventing the cable from coiling. If a mechanical cable is utilized, the cable is operably connected at one end to the power steering assist means, and at the opposite end to the propulsion unit. Steering actuation at the helm actuates the cable, more specifically the inner core, to effect output at the power steering assist means and thereby effect common movement of the steering member. Also, a plurality of steering cables may be used to provide output such as for a large engine or where two or more engines are used for the boat.

The cylinder-piston assembly and fluid source means are supported by a suitable housing for mounting, and because the system is remote from the engine, the system can be mounted in a place which is protected from exposure to the elements and to physical abuse.

DETAILED DESCRIPTION AND PREFERRED EMBODIMENTS

Figures 1, 6:
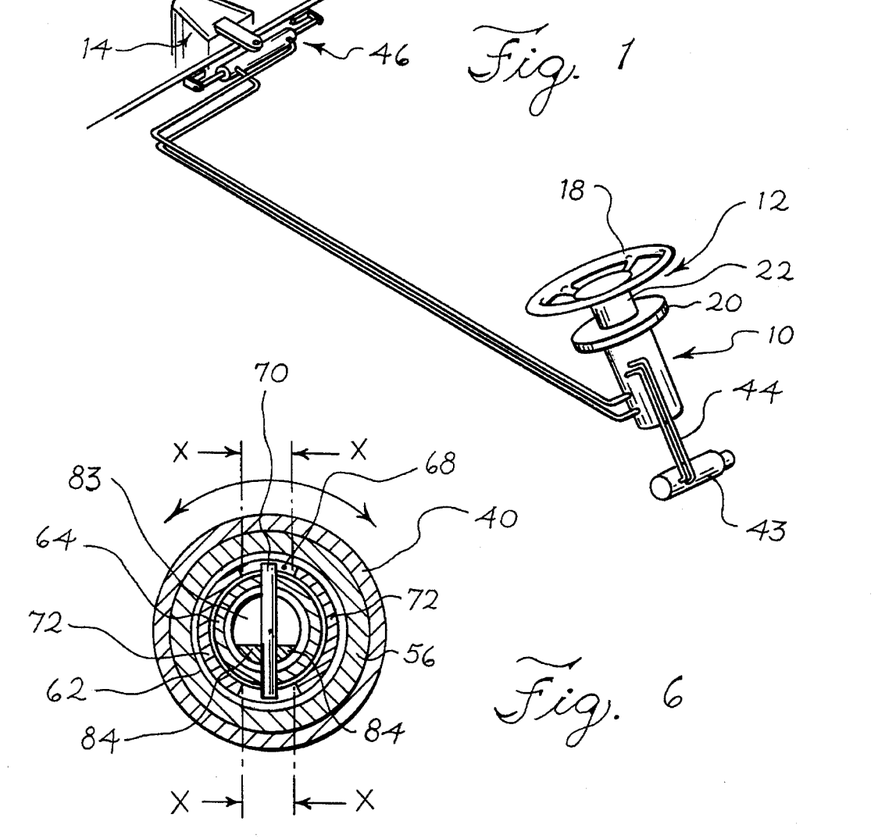
FIG. 1 is a schematic representation to show a steering arrangement utilizing the present invention for use in a marine vehicle.
FIG. 6 is a cross-sectional view on line 6—6 of FIG. 4 showing in detail the operable connection between the steering shaft and the actuator for the valve means.
Figure 2:
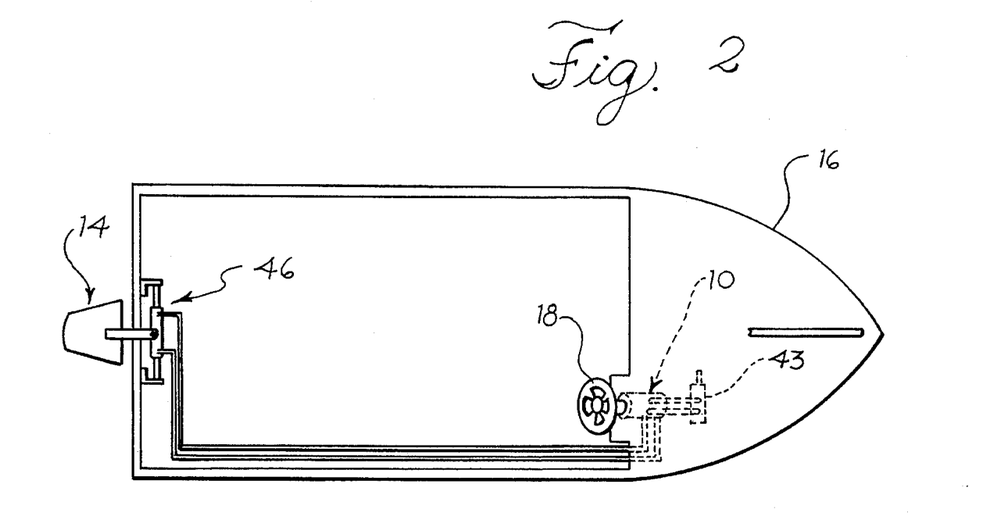
FIG. 2 is a diagrammatic plan view of a boat utilizing the structure of the invention.

Referring to the drawings, wherein the same reference numerals refer to similar parts throughout the various views, there is shown diagrammatically in FIGS. 1 and 2 a power steering system of the present invention as mounted on a boat. In accordance with the present invention, the power steering system includes a power steering assist, indicated generally by the numeral 10, operably interposed between the steering helm 12 and the propulsion unit 14 and mounted remotely from the propulsion unit. It should be understood that the power steering assist means need not be physically positioned between the helm and the propulsion unit, but the power steering assist means is in-line in that it completes the actuable connection between the helm and propulsion unit. Preferably, the power steering assist means 10 is mounted at or near the helm. As shown, the steering helm 12 is positioned at or near the fore of the boat hull 16, and typically includes a steering wheel 18 appropriately mounted in panel 20. Wheel 18 is secured to steering shaft 22 as by a threaded connection 23, which is rotatable upon rotation of the wheel. The shaft 22 extends from the steering wheel through panel mounting 20 and is operatively connected with the power steering assist means 10, as described below in detail. It should be understood that where desired the steering shaft extending from the steering wheel may comprise a connecting shaft and/or stub shaft or the like, which is conventional in the art.

Figure 3:
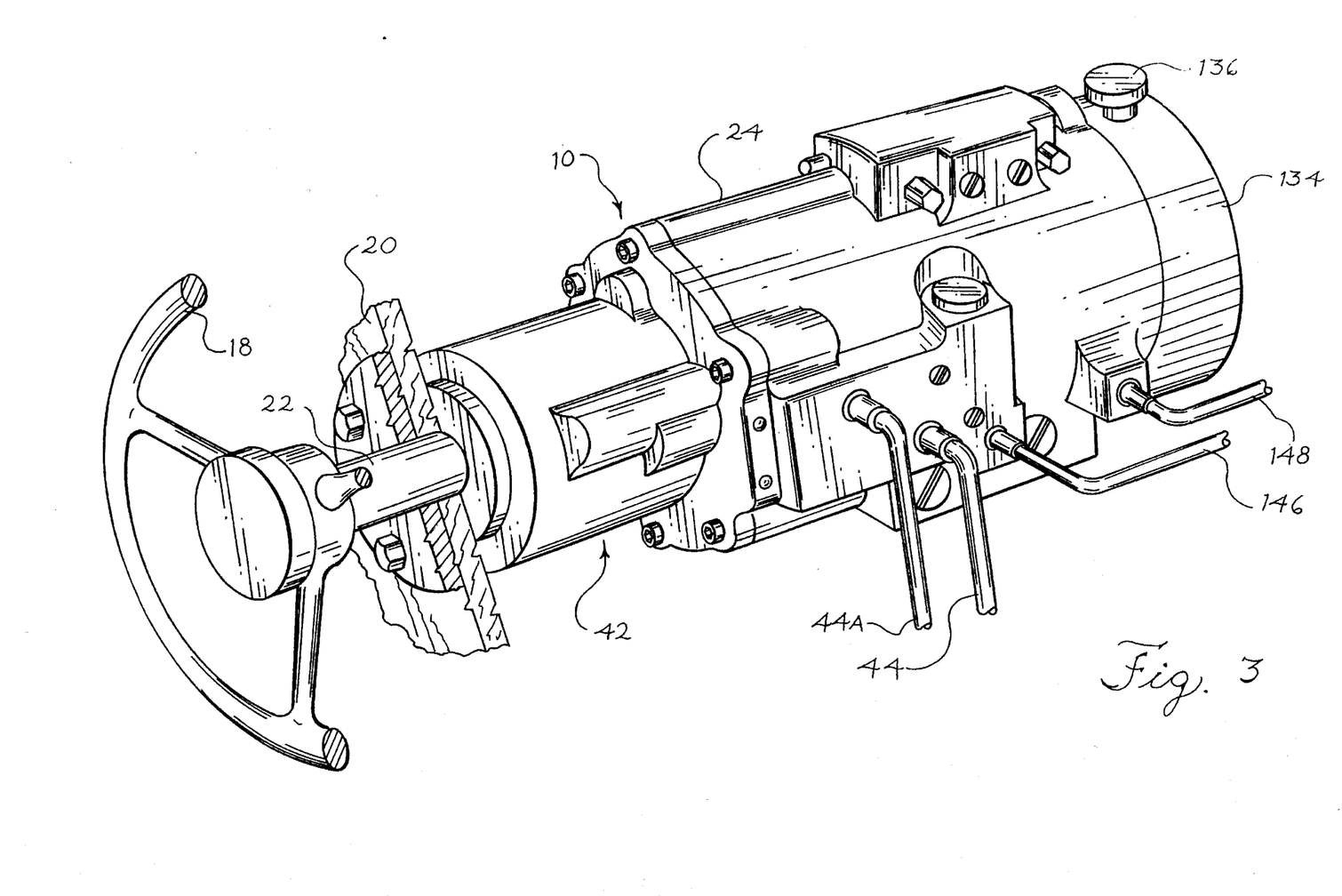
FIG. 3 is a perspective view of the power steering assist means of the present invention.
Figure 4:
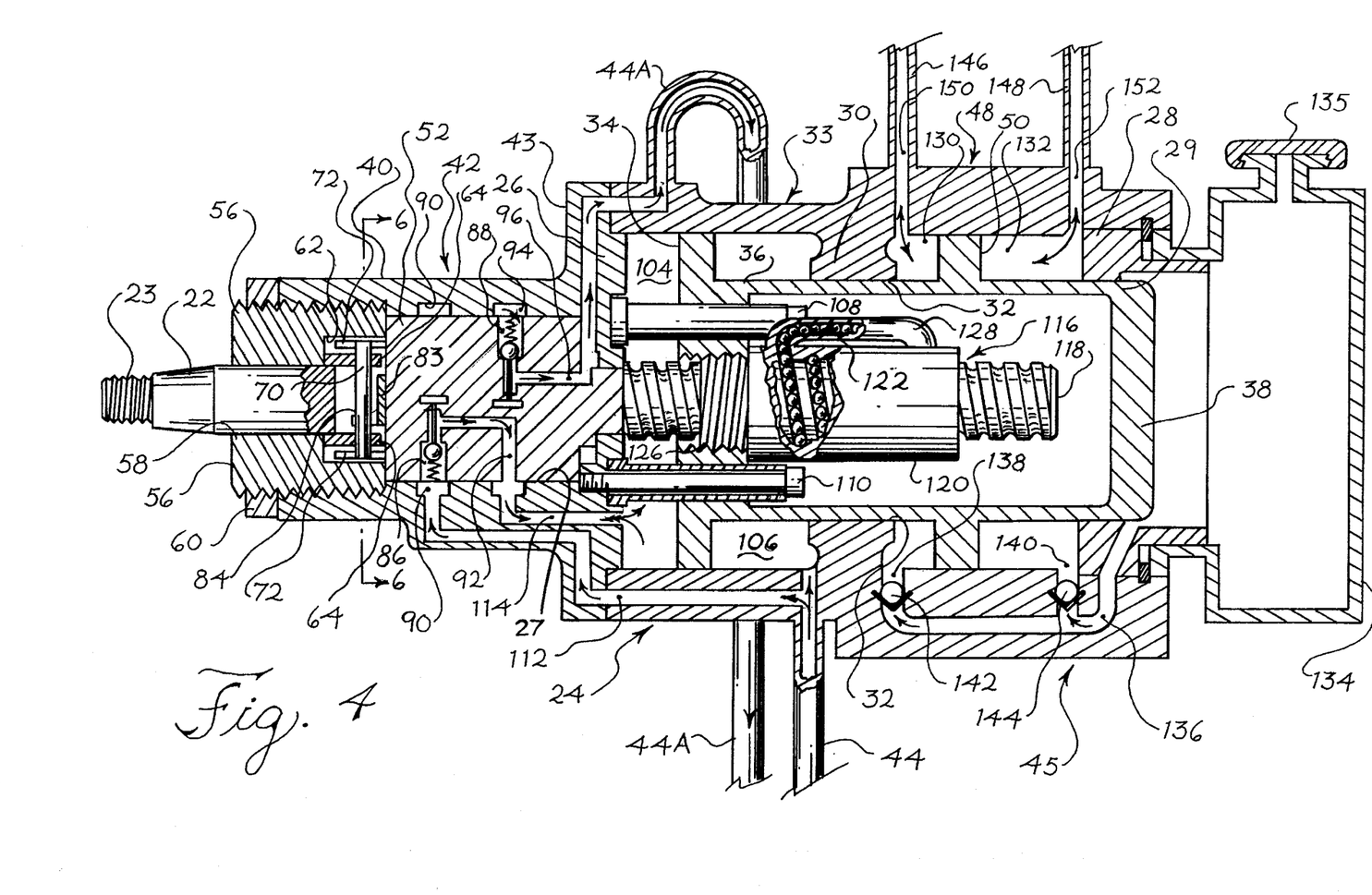
FIG. 4 is a side elevational view of the structure of power steering assist means shown in FIG. 3.
Figure 5:
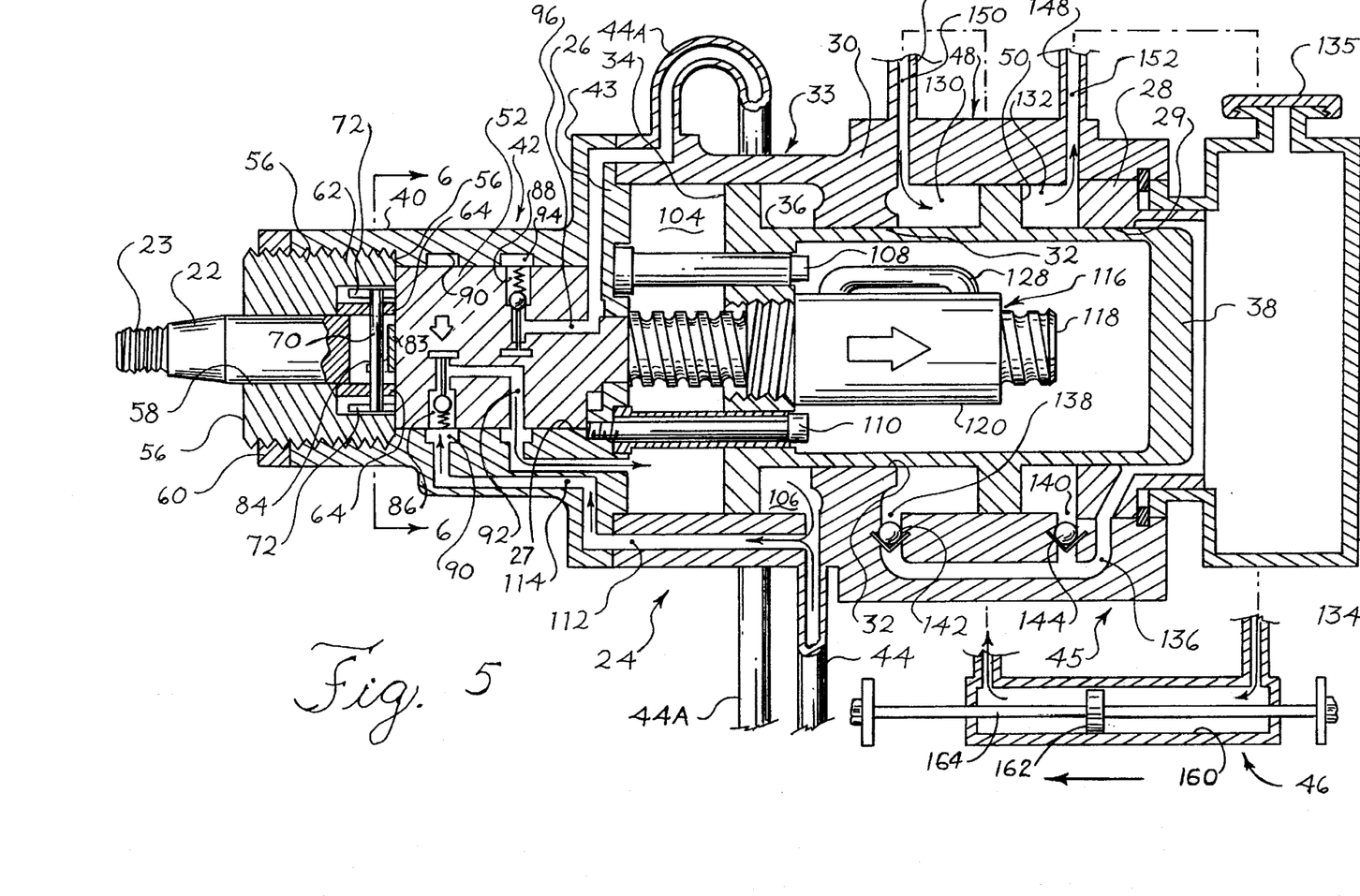
FIG. 5 is a side elevational view similar to FIG. 4 but showing movement of the parts for a right-turn direction.

In the illustrated embodiment as shown in greater detail in FIGS. 3–5, the power steering assist means 10 comprises a cylinder housing, indicated generally by the numeral 24, having opposed end walls 26 and 28, each with a centrally disposed opening 27 and 29, respectively, and transverse internal wall 30 provided with a centrally disposed opening 32. The transverse internal wall 30 and end wall 26 cooperate with the cylinder 24 to define a first hydraulic cylinder-piston assembly, indicated generally by the numeral 33, including reciprocating piston 34 mounted for reciprocating movement in cylinder 33. It will be observed that the effective areas for piston 34 are unequal. Annular ram rod 36, having closed end 38, is concentrically arranged and coaxially disposed along the longitudinal axis of cylinder 33, and extends longitudinally from the piston head, where it is affixed or secured, through the opening 32 of transverse annular wall 30 and opening 29 in end wall 28, and is slidably retained by these wall members. Cylindrical housing 40, which is generally coaxially mounted with cylindrical housing 24, accommodates or receives valve means 42, and outwardly extending, annular flange 43 conjoins cylindrical housing 40 with cylinder housing 24. The valve means 42 is operably connected at one end to steering shaft 22 and at the opposite end to the hydraulic cylinder-piston assembly 33 to control the supply of pressurized hydraulic fluid, e.g., oil, to the cylinder assembly, as explained below in greater detail. A fluid source means 41 is spaced apart from and in fluid communication with said hydraulic assembly by hydraulic hoses 44 (see FIG. 1) which are flexible and steel braided to withstand relatively high pressures, and such hoses are well known in the art and commercially available. The fluid source means typically includes a suitable tank or reservoir for holding hydraulic fluid, e.g., oil, and a pump operated by a motor (not specifically shown), such as disclosed in U.S. Pat. No. 5,228,405 and in U.S. patent application Ser. No. 08/012,552, both incorporated herein by reference and assigned to the same assignee as the instant application. The resulting connection comprising the steering input and suitable output means together with the interposed power steering assist means 10, operates in conjunction with and upon actuation of steering wheel 18 to effect steering movement of the propulsion unit. Thus, when the hydraulic cylinder-piston assembly 33 is actuated in response to steering movement at the helm, pressurized hydraulic fluid, (e.g., pressurized oil) flows through the hydraulic assembly 33 delivered from the fluid source means 43, as described below in detail. Torque from the propulsion unit 14 is overcome by the power steering assist means 10 thereby reducing the effort at the steering wheel to only the effort required to operate the hydraulic cylinder-piston assembly 33, which is independent of the torque generated by the propulsion unit.

Output means, indicated generally at 45, is operably connected to the hydraulic cylinder-piston assembly 33 and to the steering member 46 of the propulsion unit 14. It will be observed in the illustrated construction, cylinder housing 24, as a unitary structure, also houses output means 45, but it should be understood, however, that the output means may be a separate unit. The output means in the illustrated embodiment comprises a second hydraulic cylinder-piston assembly 48, defined by the end wall 28 and the transverse annular wall 30, and includes a reciprocating piston 50. Ram rod 36, slidably insertable in opening 32 of the transverse wall 30 and in opening 29 of end wall 28, extends to piston 50 and is affixed thereto. Thus, the end of the steering shaft 22 extends to the valve means 42 and is operably connected therewith for operative movement in response to rotation of the steering wheel. Rotation of the steering wheel 18 in one direction or the other actuates the valve means 42, which is operably connected to the first hydraulic cylinder-piston assembly 33 and provides power steering assist in response to actuation of the valve means. It will be observed that this input from the steering helm transfers the input to the power steering assist means. Reciprocal movement of piston 34 in turn reciprocates piston 50 thereby actuating the second hydraulic cylinder 48 of output means 45 to effect actuation of the steering member 46 to provide steering movement of the propulsion unit 14, as explained hereinbelow in greater detail.

Figures 7, 8, 9, 10:
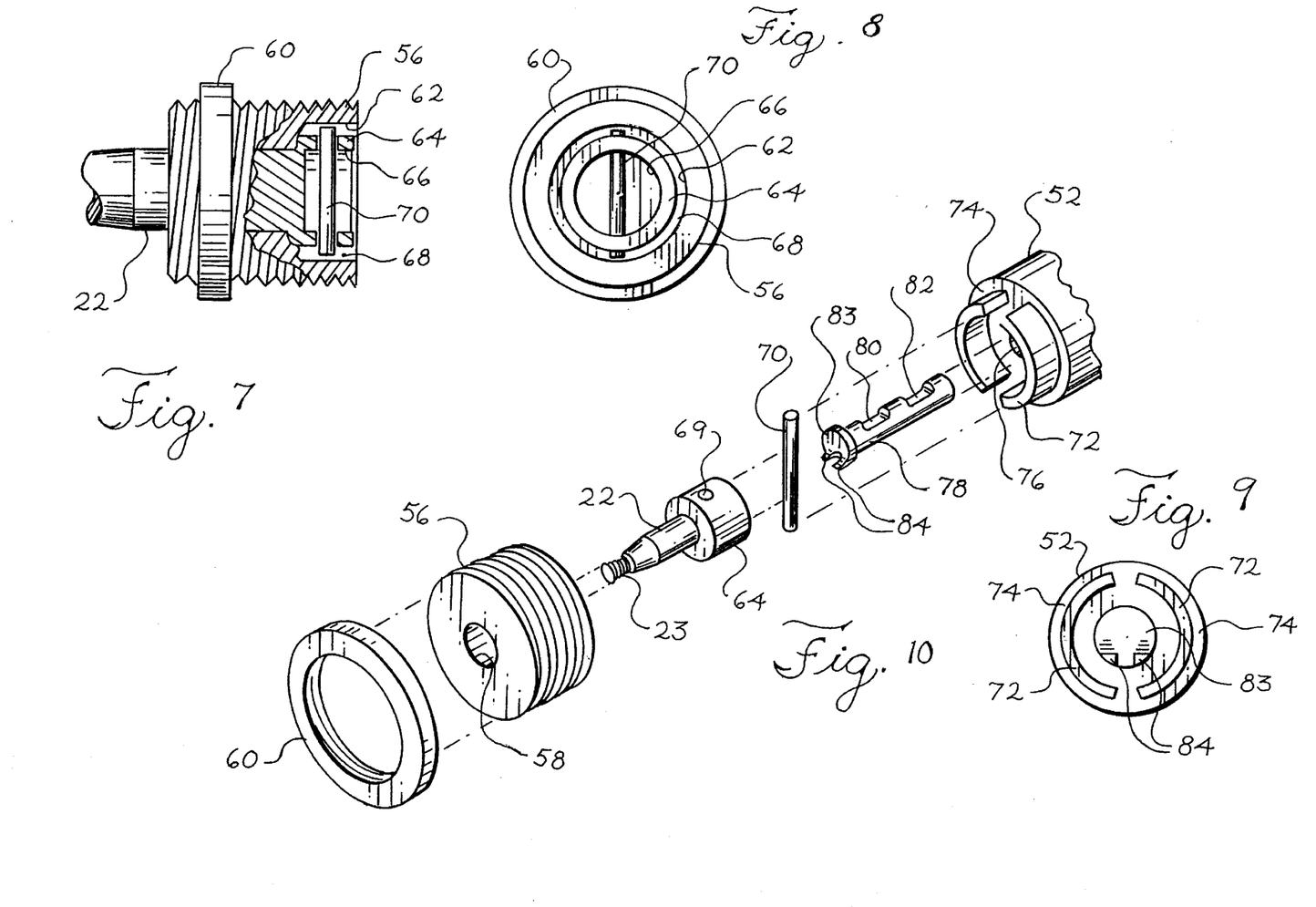
FIG. 7 is side elevational view, partly in cross-section, showing in detail the structure of the end cap.
FIG. 8 is an end view of the structure of FIG. 7.
FIG. 9 is an end view of the rotary valve body and actuator.
FIG. 10 is an exploded perspective showing the operable connection between the steering shaft, rotary valve body, and actuator.
Figure 11:
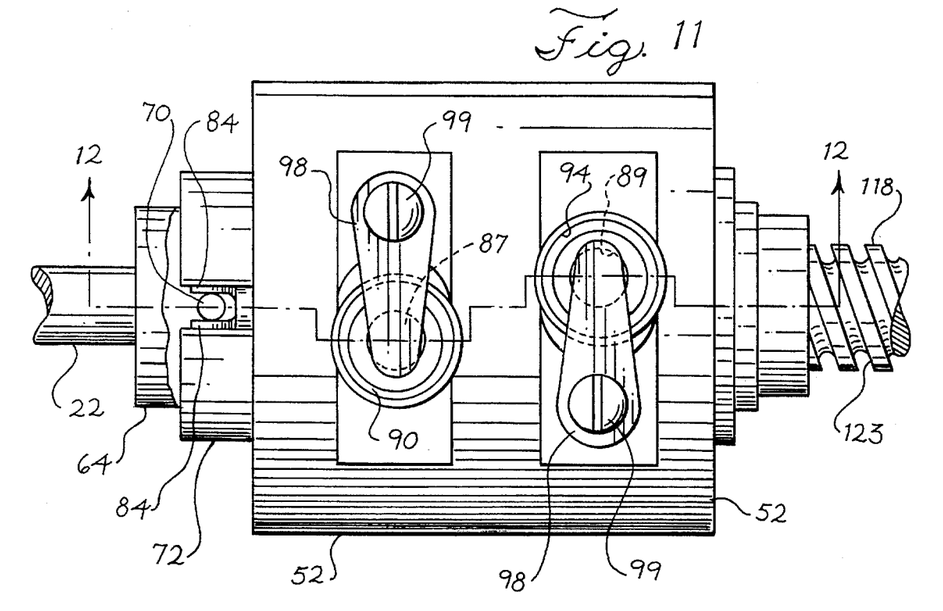
FIG. 11 is top view, partly in fragmentary, of the rotary valve body.
Figure 12:
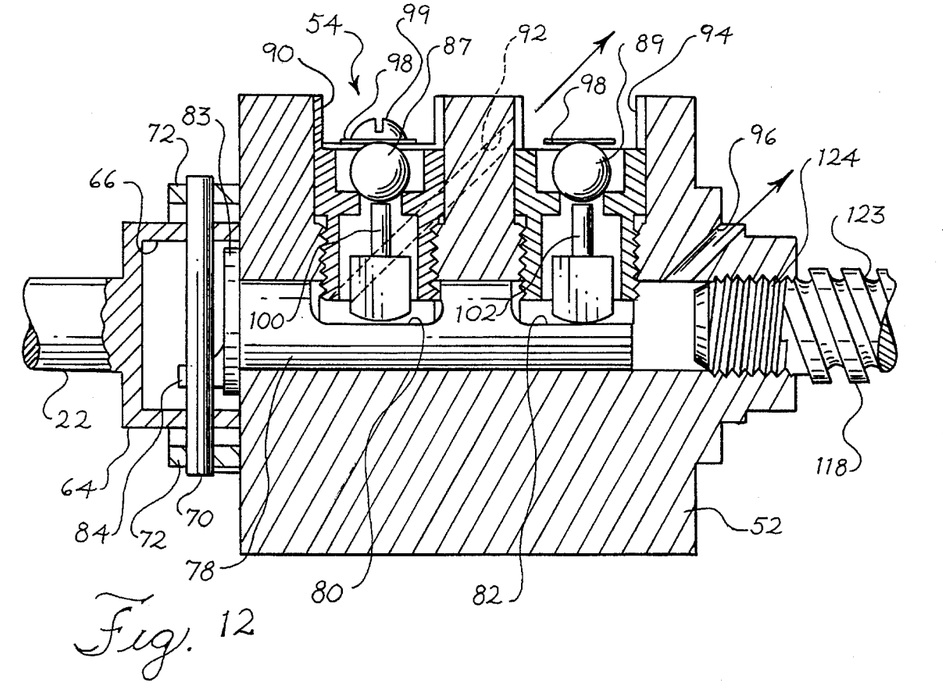
FIG. 12 is a cross-sectional view on line 12—12 of FIG. 11 showing in detail the valve means and the operable connection with the steering shaft and the connecting element from the hydraulic cylinder.

Valve means 42 comprises housing 40 for accommodating or enclosing rotary valve body 52, mounted for axial rotation, and a valve control means 54 (shown in detail in FIGS. 4, 5, 11, and 12). Housing 40 is closed at one end by end cap 56 having a centrally disposed axial bore 58 for accommodating shaft 22 extending from the steering wheel 18 through bore 58 and to valve body 52 for operable connection with valve control means 54. As best shown in FIGS. 4, 5, and 8, end cap 56 is externally threaded for threaded engagement with internally threaded valve housing 40. Steering shaft 22, threadedly engaged at one end 23 to the steering wheel 18, extends through centrally disposed opening 58 of the end cap 56, and is mounted for free rotation so that rotation of the steering wheel rotates the steering shaft without rotating the end cap. Locking nut or ring 60, which is internally threaded, is screw threaded onto the externally threaded end cap, and on assembly (see FIG. 4) the locking nut is brought into abutment with the annular marginal edge of housing 40 in order to secure the assembly. The facing of end cap 56 proximal the valve means is recessed at 62 to accommodate or receive an operable connection with the valve body 52, as explained below in detail. The opposite end of the steering shaft 22 distal from its threaded end 23 terminates with an enlarged annular section 64 of greater diameter and is provided with an open-ended cylindrical bore or cavity 66. It will be observed that the interior wall of recess 62 and the exterior wall of cavity 66 define clearance 68 as best shown in FIGS. 7 and 8. Opposed transverse holes in annular section 64 accommodate or receive pin 70 which extends transversely through the side wall of the annular section into clearance 68, and the marginal edges of the pin are spaced slightly from the interior surface of recess 62 so that, on assembly, rotation of the steering shaft 22 rotates pin 70, as explained hereinbelow in greater detail. (See FIGS. 6, 7, 8 and 9).

It should be understood that where necessary or desirable, the structure of this invention is provided with appropriate sealing gaskets and bearings (not shown), such as the pistons for the first and second cylinder-piston assemblies, to prevent leakage.

Referring now in particular to FIGS. 6, 9, 11 and 12, rotary valve body 52 of cylindrical configuration, concentrically disposed in cylinderical housing 40, is provided with axially projecting, annular stop means or limit means 72 depending laterally from the planar surface 74. The annular contour of the stop means 72, which is substantially concentric with the cylindrical valve body, conforms to the contour of clearance 68 so as to nest in that recess when, upon assembly, the marginal edges of the stop means is brought into near abutting relation with the planar transverse surface of recess 62. Rotary valve body 52 is provided with a longitudinal bore 76 for accommodating actuator 78, which is concentrically arranged and coaxially mounted with respect to the valve body 52 and the stop means 72. In a preferred embodiment as shown in FIG. 10, actuator 78 is provided with spaced apart lands 80 and 82, and the actuator terminates with an annular flange 83 having an outwardly projecting drive boss or lug 84 which is bifurcated or slotted and positioned for engagement with pin 70 thereby operably connecting the steering shaft 22 with the rotary valve body 52 of valve means 42. It will be observed that because the steering shaft 22 and rotary valve body 52 are operably connected, rotary movement of the shaft as a result of steering at the helm causes the valve body to rotate in the same direction. Thus, upon assembly, the pin 70 is engaged by the slotted section of boss 84, and rotation of the steering shaft in either direction depending upon the direction of steering rotates the actuator 78 for a travel distance between the neutral position to a maximum distance of "x—x" when the pin 70 engages stop means 72 (see FIG. 6), but the travel distance will vary depending upon the rotational speed of the steering wheel.

As more clearly shown in FIGS. 4, 5, 11 and 12, valve control means 54 includes first and second ball check valves 86 and 88, respectively, disposed in valve body 52 and essentially on opposite sides of the longitudinal axis of the valve body. The rotary valve body 52 being concentric with cylindrical housing 40 cooperate to define annular channel 90 which is in fluid communication with fluid passageway 92, and similarly define annular channel 94 which is in fluid communication with fluid passageway 96. First check valve 86 controls the flow of pressurized hydraulic fluid delivered from the fluid source means 43 through a first fluid communication means (described below) including annular channel 90 (see FIGS. 4 and 5) and fluid passageway 92 to the first cylinder-piston assembly 33; and second check valve 88 controls the flow of pressurized hydraulic fluid from the first cylinder-piston assembly 33 through a second fluid communication means (described below) including annular channel 94 (see FIGS. 4 and 5) and fluid passageway 96. In this manner, the flow of hydraulic fluid, e.g. oil, is essentially in one direction only. As shown in the illustrated construction and as best viewed in FIGS. 11 and 12, the first and second ball check valves 86 and 88 have a check ball shown as check balls 87 and 89, respectively, and when in a no steering change position, each ball check valve is maintained in a closed position by suitable bias means 98, such as a flat spring and secured by screw or rivet 99, which biases each ball against a cooperating seat so as to prevent the passage of oil through the ball check valve. In this position, the valve control means 54 is closed and remains closed. Ball actuator pins 100 and 102 are positioned on lands 80 and 82, respectively, of actuator 78, and the opposed marginal edge or terminus of each actuator pin is spaced slightly from the check ball, or may just touch, when in a no steering change position. Upon steering movement to the left or right, one pin or the other, depending upon the direction of steering, is brought into contact with a check ball so as to unseat the ball. That is, upon rotary movement of the ball actuator 78 to the left or to the right, an actuator pin engages a check ball to move the check ball from its seat, thereby allowing for the flow of pressurized hydraulic fluid, e.g. oil, through the valve assembly and the first cylinder-piston assembly, as explained below. Thus, it will be observed from FIGS. 4, 5, 11 and 12 that when ball actuator 78 is moved to the left as by a left steering motion, pin 100 is moved to engage check ball 87, thereby opening ball check valve 86. Conversely, when ball actuator 78 is moved to the right as by a right steering motion, pin 102 is moved to engage check ball 89, thereby opening ball check valve 88.

As explained above, the first hydraulic cylinder-piston assembly 33 includes cylinder housing 24 and reciprocating piston 34 slidably mounted for reciprocating movement in the bore of the cylinder 33. Ram rod 36 being substantially concentric with cylinder housing 24 extends longitudinally from the piston head 34 and through transverse internal wall 30 and end wall 28. It will be observed that the piston 34 divides the first cylinder assembly 33 into a first chamber 104 defined by the end wall 26 and piston head 34, and a second chamber 106 defined by the piston head 34 and transverse annular wall 30. One or more anti-rotational pins 108 and 110 extend longitudinally from end wall 26 and are affixed thereto as by a screw threaded connection, and are slidably insertable in piston 34, thereby preventing the piston from rotating but allowing it to move reciprocally in the cylinder 33. Also, ram rod 36 extending axially from the piston head 34 occupies a portion of the second chamber 106, which thereby reduces the piston area in that chamber relative to the piston area in chamber 104. Thus, the effective piston area in chamber 104 is greater than the effective piston area in chamber 106. In a preferred embodiment of the invention, the piston area in chamber 106 is one-half the piston area in chamber 104, and consequently the oil pressure in chamber 104 is one-half the pressure in chamber 106. The resulting reciprocal movement of the piston is determined by the flow of pressurized fluid supplied to or exhausted from chamber 104, which is the piston side of greater effective area. Therefore, upon steering actuation, when the pressure in chamber 104 becomes greater than half the pressure in chamber 106, the piston 34 will move to the right, as viewed in FIGS. 4 and 5 (the direction of the large arrow shown in FIG. 5).

As explained above, valve means 42 controls the supply of pressurized hydraulic fluid, e.g., oil, from the fluid source means 43 and the first cylinder-piston assembly 33, thereby establishing a first fluid communication means. Thus, fluid passageway 112 leading through cylinder housing 24 and valve housing 40 establishes fluid communication between the fluid source means 43 and annular channel 90 in housing 40. It will be observed that pressurized fluid from the fluid source means 43 enters the passageway 112 through hydraulic hose 44 (see FIG. 4, where the arrow shows the direction of flow), passes into channel 90, and, and upon actuation of check valve 86, through passageway 92 and into fluid communication with the first chamber 104 of cylinder-piston assembly 33. When this occurs upon steering actuation, the piston 34 moves to the right, as shown in the drawings, and fluid in second chamber 106 will be forced out and merge with fluid in passageway 112, thereby completing a first fluid communication means between the fluid source means 43 and the cylinder 33.

Similarly, valve means 42 controls the supply of pressurized hydraulic fluid from the first cylinder-piston assembly 33 and returned to the fluid source means 43, thereby establishing a second fluid communication means. Actuation of check valve 88 allows for pressurized hydraulic fluid to flow out of first chamber 104 to the fluid source means 43, and from the fluid source means into the second chamber 106 of cylinder-piston assembly 33, thereby forcing the piston 34 to move to the left as viewed in FIGS. 4 or 5. As shown, chamber 104 is in fluid communication with annular channel 94 via passageway 114 in valve housing 40, and channel 94 is opened to fluid communication with passageway 96 upon actuation of check valve 88, which leads to return hose 44, thereby establishing a second fluid communication means. When this occurs upon steering actuation, the piston 34 moves to the left as shown in the drawings.

It therefore will be observed that establishing the first and second fluid communication means permits the passage of pressurized hydraulic fluid to effect actuation of the power steering assist means. Thus, the valve means 42 is normally biased to a no-steering or neutral position. Steering actuation for a right turn rotates actuator 78 causing check valve 86 to open. Pressurized hydraulic fluid then passes from fluid source means 43 and hose 44 to first chamber 104 of the first cylinder-piston assembly 33 via a first fluid communication means comprising passageway 112, annular channel 90, passageway 92 and into first chamber 104. Hydraulic pressure is exerted against the piston 34 causing the piston to move to the right (the direction of the big arrow in FIG. 5), and hydraulic fluid leaves second chamber 106 and flows into line 112. When steering actuation is in the opposite direction, check valve 88 is opened. Pressurized hydraulic fluid then passes from fluid source means 43 and hose 44 to second chamber 106 and out of first chamber 104 via the second fluid communication means including passageway 114, annular channel 94 and passageway 96, and to return hose 44. The piston 34 is then caused to move to the left.

As stated above, a connecting element, indicated generally by the numeral 116, is operably connected to piston 34 of the first cylinder-piston assembly 33 and to the rotary valve body 52 in order to transmit rotational movement to the valve body upon reciprocal movement of the piston, which occurs upon steering actuation. Thus, steering actuation will operate actuator 78 to keep open the appropriate check valve (either check valve 86 or 88 depending upon the direction of steering), and as a consequence the system continues to move and thereby assists in steering. When steering is stopped, the valve body 52 rotates until the valve is closed. In the illustrated embodiment, connecting element 116 comprises a ball screw 118 and concentrically arranged ball nut 120, and are operably connected by a train of balls 122. A ball worm and nut connection of this general type or structure is conventional and well understood in the art. In accordance with the present invention, ball screw 118, having external helical grooves 123, is longitudinally or coaxially disposed in cylinder 33, and extends from rotary valve body 52, where it is affixed as by threaded connection 124, through piston 34 and coaxially with ram rod 36 and spaced from closed end 38. Ball nut 120, having internal helical grooves complementary with the external grooves of ball screw 118 for accommodating or receiving the train of balls 122, depends axially from piston 34 and is secured thereto as by threaded connection 126, and is concentrically arranged with the ball screw. The connection between the ball screw 118 and ball nut 120 is effected through the train of balls 122 recirculated in the complementary helical grooves by means of a return tube 128. Thus, in accordance with the structure as described and illustrated, it will be observed that reciprocal movement of piston 34 will cause ball nut 120 to travel linearly or axially on the ball screw 118. This axial movement of the ball nut is translated into rotational movement of the ball screw by reason of the helical connection. As a consequence, the rotary valve body 52 being affixed to the ball screw is caused to rotate in the direction corresponding to the direction of the ball screw, which will be at the same rotational speed as the steering shaft 22. The rotational speed of the valve body and ball screw are the same. When the operator stops turning the steering wheel, the valve body rotates until the check valve is closed, which is essentially simultaneous with stopping the turning of the wheel, and thereby stopping the flow of hydraulic fluid and thus stopping the system.

Referring again to FIGS. 4 and 5, there is shown a hydraulic output means 45 housed in cylinder 24, and although shown as an integrally structured unit, it should be understood that the output means may be a separate unit actually connected to the power steering assist means by suitable bracketry and hydraulic or mechanical connections. In the preferred embodiment as illustrated, the output means, positioned or arranged between the power steering assist means 10 and the steering member 46 and disposed in housing 24, comprises the second cylinder-piston assembly 48 defined by the transverse internal wall 30 and end wall 28. As explained above, ram rod 36 projects axially from piston 34 through the openings 32 and 29 in walls 30 and 28, respectively. Piston 50, affixed or secured to the ram rod or formed integrally therewith and mounted for reciprocal movement, divides the second cylinder assembly 48 into annular chambers 130 and 132. Reservoir or tank 134, which holds hydraulic fluid (e.g., oil), is formed integrally with housing 24 and disposed outwardly from end wall 28. Reservoir 134 may be provided with a screw threaded cap 135, as shown, in order to provide easy access in the event of the need to replenish any fluid losses.

Cylinder housing 24 is provided with a fluid passageway 136 that opens to the reservoir 134 to provide fluid communication between the reservoir and the second cylinder-piston assembly 48. Passageway 136 is branched at 138 to provide fluid communication with chamber 130, and at 140 to provide fluid communicationn with chamber chamber 132. Suitable valving to control the flow of hydraulic fluid from the reservoir to the cylinder 48 comprises check valves 142 and 144, which are normally biased to a closed or neutral position. Such suitable check valves may be, for example, ball check valves, swing check valves, or the like, for selectively supplying hydraulic fluid to one chamber and draining fluid from the other.

The second cylinder-piston assembly 48 is also in fluid communication with steering member 46 via hydraulic hoses 146 and 148. Thus, passageway 150 in cylinder housing 26 opens to chamber 30 and at the opposite end to hydraulic hose 146, and similarly, passageway 152 opens to chamber 132 and at the opposite end to hydraulic hose 148. Upon steering at the helm, reciprocally mounted piston 34 moves, such as to the right as shown in FIG. 5, which simultaneously moves piston 50 to the right. Hydraulic fluid (oil) is forced from annular channel 132, through passageway 152 and hydraulic hose 148, and into the hydraulic cylinder 160 of steering member 46. Steering members for outboard engines are well known and commercially available and are described in U.S. Pat. Nos. 4,373,920 and 4,773,882, which disclose hydraulic means for rotating the propulsion unit about a steering axis. Thus, oil entering cylinder 160 and against the piston 162 moves the piston and rod 164 to the left which, mounted with suitable bracketry (not shown), provides steering actuation to the propulsion unit. Reciprocal movement of the piston 162 forces oil out of the opposite side of the cylinder 160, through hydraulic hose 146, and oil is then drawn into chamber annular 130. Steering at the helm in the opposite direction will effect movement of the piston 50, and in turn piston 162, thereby turning the propulsion unit in the opposite direction. In the event there is a loss of oil in either chamber 130 or 132, oil will be drawn by vacuum from reservoir 134, through fluid passageway 136 and check valves 142 or 144, and into the appropriate chamber depending on the direction of turn. Cap 135 is provided in order to have access to the reservoir to replenish it if there is any oil losses.

What is claimed is:

1. A power steering assist system comprising:
   (a) a rotatable input member;
   (b) a hydraulic cylinder having a reciprocally mounted piston and fluid passageways longitudially spaced to each side of said piston to form a first chamber and a second chamber in said cylinder, the effective areas of each side of said piston being unequal;

(c) fluid source means for supplying pressurized hydraulic fluid to said cylinder;

(d) valve control means operably connected to said input member and having a rotatable valve body, said valve control means adapted to selectively control the flow of hydraulic fluid to said cylinder whereby the resulting reciprocal movement of said piston is determined by the flow of pressurized fluid supplied to or exhausted from the chamber having the piston side of greater effective area; and (f) output means operably connected to said piston.

2. A power steering system according to claim 1 further including a ball screw extending longitudinally in said cylinder outwardly from said piston and operably connected at one end thereof with said valve body; a ball nut in concentric relation with said ball screw, and having a recirculating ball connection with said ball screw and operably connected to said piston so as to move axially on reciprocal movement of said piston, whereby axial movement of said ball nut is translated into rotary movement of said ball screw so as to rotate said valve body.

3. A power steering assist system according to claim 2 wherein said cylinder being a first cylinder includes an inwardly disposed end wall having an opening, a ram rod extending coaxially in said cylinder from said piston through said opening and mounted for reciprocative movement upon reciprocal movement of said piston, and actuable output means comprising a second hydraulic cylinder operably connected to said ram rod whereby said second cylinder is actuated in response to selective flow of hydraulic fluid to said first cylinder.

4. A power steering assist system comprising:

(a) a rotatable input member;

(b) a hydraulic cylinder having a reciprocally mounted piston and fluid passageways longitudinally spaced to each side of said piston to form a first chamber and a second chamber in said cylinder;

(c) valve control means operably connected to said input member, and including a rotatable valve body operably connected to said piston and first and second valve means;

(d) fluid source means for supplying pressurized hydraulic fluid to said cylinder;

(e) first fluid communication means between said fluid source means, said first chamber, said first valve means, and said second chamber upon rotation of said input member in one direction; and second fluid communication means between said first chamber, said second valve means, said fluid source means, and said second chamber upon rotation of said input member in the opposite direction; and (f) output means operably connected to said piston.

5. A power steering assist system according to claim 4 wherein said cylinder being a first cylinder includes an inwardly disposed end wall having an opening, a ram rod extending coaxially in said cylinder from said piston through said opening and mounted for reciprocative movement upon reciprocal movement of said piston, and actuable output means comprising a second hydraulic cylinder operably connected to said ram rod whereby said second cylinder is actuated in response to selective flow of hydraulic fluid to said first cylinder.

6. A power steering assist system comprising:

(b) a rotatable input member;

(a) a hydraulic cylinder having a reciprocally mounted piston and fluid passageways longitudinally spaced to each side of said piston to form a first chamber and a second chamber in said cylinder, the effective areas of each side of said piston being unequal;

(c) an output member operably connected to said piston;

(d) fluid source means for supplying pressurized hydraulic fluid to said cylinder;

(d) valve control means operably connected to said input member and having a rotatable valve body, said valve control means adapted to selectively control the flow of hydraulic fluid to said cylinder, whereby the resulting reciprocal movement of said piston is determined by the flow of pressurized fluid supplied to or exhausted from the chamber having the piston side of greater effective area; and (e) a connecting means operatively connected to said piston and to said valve body, and mounted for rotatable movement upon reciprocal movement of said piston so as to rotate said valve body.

7. A power steering system according to claim 6 wherein said connecting means comprises a ball screw extending longitudinally in said cylinder through said piston and operably connected at one end thereof with said valve body, and a ball nut in concentric relation with said ball screw, and having a recirculating ball connection with said ball screw and operably connected to said piston so as to move axially on reciprocal movement of said piston, whereby axial movement of said ball nut is translated into rotary movement of said ball screw so as to rotate said valve body.

8. A power steering assist system according to claim 7 wherein said cylinder being a first cylinder includes an inwardly disposed end wall having an opening, a ram rod extending coaxially in said first cylinder from said piston through said opening and mounted for reciprocative movement upon reciprocal movement of said piston, and actuable output means comprising a second hydraulic cylinder operably connected to said ram rod whereby said second cylinder is actuated in response to selective flow of hydraulic fluid to said first cylinder.

9. A power steering assist system comprising:

(a) a rotatable input member;

(b) a hydraulic cylinder having a reciprocally mounted piston and fluid passageways longitudinally spaced to each side of said piston to form a first chamber and a second chamber in said cylinder;

(c) an output member operably connected to said piston;

(d) fluid source means for supplying pressurized hydraulic fluid to said cylinder;

(e) valve control means operably connected to said input member and having a rotatable valve body, said valve control means including first and second valve means;

(f) a connecting means operatively connected to said piston and to said valve body, and mounted for rotatable movement upon reciprocal movement of said piston so as to rotate said valve body;

(g) first fluid communication means between said fluid source means, said first chamber, said first valve means, and said second chamber upon rotation of said input member in one direction; and second fluid communication means between said first chamber, said second valve means, said fluid source means, and said second chamber upon rotation of said input member in the opposite direction.

10. A power steering system adaptable for a marine vehicle having a propulsion unit pivotal about a steering axis, actuable steering means for applying torque to said propulsion unit to effect steering movement thereof about said steering axis, and including an operator actuable steering helm and a steering member connected to said propulsion unit, said steering helm including an input member operable upon steering actuation; said system comprising: (a) hydraulic cylinder having a reciprocally mounted piston; (b) fluid source means for supplying hydraulic fluid to said cylinder; (c) rotary valve control means adapted to establish fluid communication between said cylinder and said fluid source means and operably connected to said input member for operative movement in response to said steering actuation to provide actuable input to said cylinder; (d) actuable output means operably connected to said piston for operative movement in response to said actuating input, and operably connected to said actuable steering means, thereby actuating the actuable steering means in response to reciprocal movement of said piston for overcoming torque on said propulsion unit relative to said steering axis in response to actuation of said actuable steering means, said actuable steering means providing actuable output to effect common movement of said steering member in response to said steering actuation to pivot said propulsion unit about said steering axis.

11. A power steering system according to claim 10 wherein said hydraulic cylinder includes fluid passageways longitudially spaced to each side of said piston to form a first chamber and a second chamber in said cylinder, the effective areas of each side of said piston being unequal; and said valve control means operably connected to said input member and having a rotatable valve body, said valve control means adapted to selectively control the flow of hydraulic fluid to said cylinder, whereby the resulting reciprocal movement of said piston is determined by the flow of pressurized fluid supplied to or exhausted from the chamber having the piston side of greater effective area.

12. A power steering assist system according to claim 10 or 11 wherein said cylinder includes an inwardly disposed end wall having an opening, a ram rod extending coaxially in said cylinder from said piston through said opening and connected to said output means, said ram rod mounted for reciprocative movement upon reciprocal movement of said piston.

13. A power steering assist system according to claim 12 wherein the piston area of the first chamber is one-half the piston area of the second chamber.

14. A power steering assist system according to claim 11 wherein said output means comprises a second hydraulic cylinder, a ram rod extending coaxially to said second hydraulic cylinder and operably connected thereto, whereby reciprocal movement of said ram rod actuates said second cylinder.

15. A power steering assist system according to claim 10 wherein said hydraulic cylinder includes fluid passageways longitudinally spaced to each side of said piston to form a first chamber and a second chamber in said cylinder; said valve control means includes a rotatable valve body having first and second valve means; first fluid communication means between said fluid source means, said first chamber, said first valve means, and said second chamber upon actuation of said input member for steering in one direction; and second fluid communication means between said first chamber, said second valve means, and said fluid source means upon actuation of said input member for steering in the opposite direction.

16. A power steering assist system according to claim 15 wherein said cylinder includes an inwardly disposed end wall having an opening, a ram rod extending coaxially in said cylinder from said piston through said opening and connected to said output means, said ram rod mounted for reciprocative movement upon reciprocal movement of said piston.

17. A power steering assist system according to claim 15 wherein the piston area of the first chamber is one-half the piston area of the second chamber.

18. A power steering assist system according to any one of claims 1, 2, 3, 4, 5, 6, 9, 7, 8, 10, or 11 further including actuating means operably connected to said input member to selectively actuate said valve control means to control the flow of hydraulic fluid delivered from said fluid source means.

19. A power steering assist system according to claim 18 wherein said actuating means is disposed for rotatable movement along an axis substantially coinciding with the longitudinal axis of said rotatable valve body, and means for limiting the rotary travel distance in both directions of said actuating means for actuating said valve control means.

20. A power steering assist system according to any one of claims 1–4, 5–11 wherein the piston area of the first chamber is one-half the piston area of the second chamber.

21. A power steering system according to claim 17 or 14 wherein said connecting means comprises a ball screw extending longitudinally in said cylinder through said piston and operably connected at one end thereof with said valve body, and a ball nut in concentric relation with said ball screw, and having a recirculating ball connection with said ball screw and operably connected to said piston so as to move axially on reciprocal movement of said piston, whereby axial movement of said ball nut is translated into rotary movement of said ball screw so as to rotate said valve body.

22. A power steering assist system, comprising: (a) a rotatable input member; (b) a first hydraulic cylinder having a reciprocally mounted first piston and fluid passageways longitudinally spaced to each side of said piston to form a first chamber and a second chamber in said cylinder, the effective area of each side of said piston being unequal; (c) a second hydraulic cylinder having a reciprocally mounted second piston and disposed at one end and co-axially aligned with said first cylinder; (d) an internal transverse party wall separating said first and second cylinders; (e) a ram rod co-axially aligned in said first and second cylinders extending from said first piston through said party wall and affixed to said second piston, said ram rod having a closed end disposed outwardly from said second cylinder; (f) fluid source means for supplying pressurized hydraulic fluid to said first cylinder; (g) valve control means having a rotatable valve body disposed adjacent the opposite end of said first cylinder and having first and second valve means operably connected to said input member, said valve control means adapted to selectively control the flow of hydraulic fluid to said cylinder, whereby the resulting reciprocal movement of said piston is determined by the flow of pressurized fluid supplied to or exhausted from the chamber having the piston side of greater effective area; (h) connecting means operatively connected to said first piston and to said valve body, and mounted for rotatable movement upon reciprocal movement of said first piston so as to rotate said valve body to effect reciprocal movement of said first piston, thereby effecting a corresponding reciprocal movement of said second piston; and (i) actuable steering means operably connected to said second cylinder.

23. A power steering system according to claim 22 further including first fluid communication means between said fluid source means, said first chamber, said first valve means, and said second chamber upon rotation of said input member in one direction; and second fluid communication means between said first chamber, said second valve means, said fluid source means, and said second chamber upon rotation of said input member in the opposite direction.

24. A power steering assist system according to claim 22 or 23 further including actuating means operably connected to said input member and responsive to actuation of said input member to control the flow of hydraulic fluid delivered from said fluid source means and to selectively actuate said first and second valve means to establish said fluid communication upon actuation of said input member, whereby hydraulic fluid is delivered from said fluid source means to said first cylinder.

25. A power steering assist system according to claim 24 wherein said first and second valves are spaced apart along the longitudinal axis of said valve body, means to bias said first and second valves to a closed, no steering change position, and said first fluid communication means includes said first valve when actuated to an open postion, and said second communication means includes said second valve when activated to an open position.

26. A power steering assist system adaptable for a marine vehicle having a steering member connected to a propulsion unit, comprising: (a) a rotatable input member; (b) a cylindrical housing having a first hydraulic cylinder-piston assembly, said cylinderical housing having first and second end walls and an internally disposed transverse wall with an opening therein; (c) an annular ram rod connected to said first piston and extending through said transverse wall and spaced from said second end wall; (d) fluid passageways for said first cylinder-piston assembly longitudinally spaced to each side of said first piston to form a first chamber and a second chamber in said first cylinder-piston assembly; (e) rotatable valve body connected to said first cylinder-piston assembly adjacent said first end wall and having valve control means operably connected to said input member, and said valve body operably connected to said first piston; (f) a second hydraulic cylinder-piston assembly defined by said transverse wall and said second end wall and operably connected to said steering member, said second cylinder having fluid passageways longitudinally spaced to each side of said second piston for establishing fluid communication with said steering member, whereby reciprocal movement of said first piston reciprocally moves said second piston for effecting movement of said steering member to thereby steer said propulsion unit.

\* \* \* \* \*